Oct. 30, 1956  R. D. KREHBIEL  2,768,864
BEARING CONSTRUCTION FOR DISK FURROW OPENERS
Filed Dec. 17, 1953

*INVENTOR.*
ROBERT D. KREHBIEL
BY
ATTORNEYS

United States Patent Office 2,768,864
Patented Oct. 30, 1956

2,768,864

BEARING CONSTRUCTION FOR DISK FURROW OPENERS

Robert D. Krehbiel, Hutchinson, Kans., assignor to Deere & Company, Moline, Ill., a corporation of Illinois Application December 17, 1953, Serial No. 398,790

2 Claims. (Cl. 308—181)

The present invention relates generally to agricultural implements and is more particularly concerned with new and improved bearing means for ground-working disks and the like, such as those used in forming furrows, cultivating the soil, or the like.

The object and general nature of the present invention is the provision of a disk bearing construction that is exceedingly compact yet has substantial lateral stability. Further, it is an important feature of this invention to provide a bearing construction for ground-working disks, so constructed and arranged that the disks may be removed from the bearing unit, as for repair and/or replacement, without exposing the interior lubricated bearing surfaces to contamination. It is also an important feature of this invention to provide a bearing construction for concavo convex disks, such as those used in agricultural work, in which the bearing construction is disposed at the concave side of the disk and does not materially extend beyond the plane of the disk edge. More specifically, it is an object of this invention to provide a disk harrow bearing arrangement in which disassembly of the component parts, as for cleaning, repair, replacement or the like, may easily be accomplished.

These and other objects and advantages of the present invention will be apparent to those skilled in the art after a consideration of the following detailed description, taken in conjunction with the accompanying drawings, in which.

Figure 1:
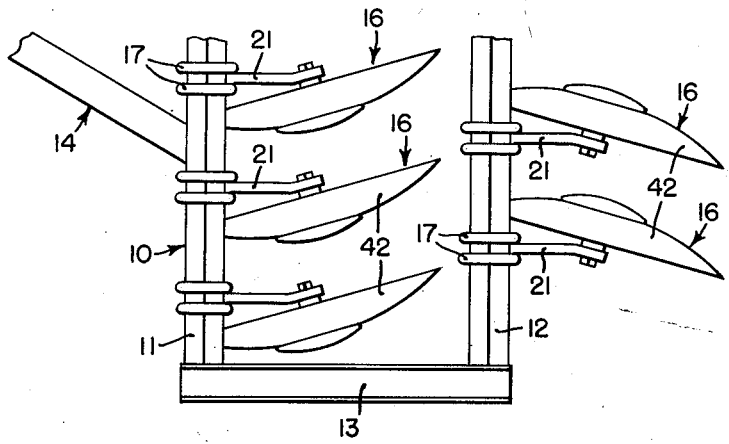
Fig. 1 is a partial plan view of a disk harrow in which the principles of the present invention have been incorporated.

Referring first to Fig. 1, the disk harrow includes a main frame 10 that is made up of a pair of tranverse square bars 11 and 12 disposed in fore-and-aft spaced apart relation and securely interconnected by a pair of end bars 13, only one of which is shown in Fig. 1. The harrow also includes a draft frame 14 to which a propelling agency, such as a farm tractor, may be connected. Arranged on the front and rear crossbars 11 and 12 is a plurality of individually mounted disk blade units 16, each secured to the associated crossbar by a pair of clamping U-bolts 17 or other suitable clamping or fastening means.

Figure 2:
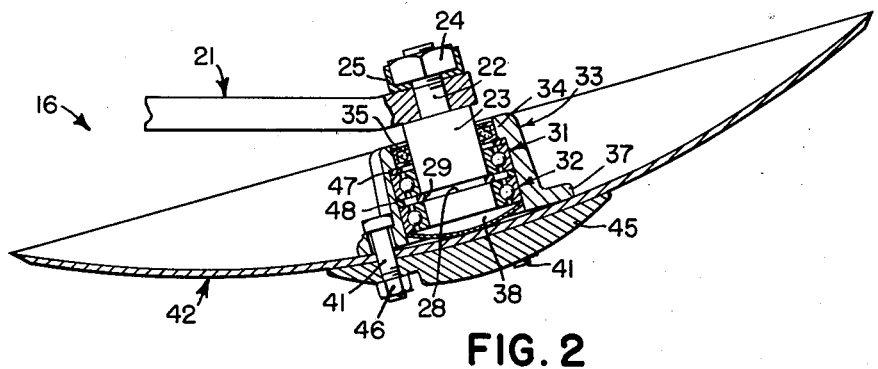
Fig. 2 is a horizontal sectional view taken through the bearing unit and associated parts for one of the disks shown in Fig. 1.

As best shown in Fig. 2, each of the units 16 includes a support in the form of a shank 21 that extends downwardly and rearwardly from the associated bar, 11 or 12, and the lower end of the standard 21 is apertured to receive the inner reduced end portion 22 of a spindle member 23. The end of the reduced section 22 is threaded to receive a fastening nut 24 and associated holding or retaining means 25. Between its inner and outer ends, the spindle 23 is provided with a groove 28 in which a snap ring 29 is adapted to be disposed, the snap ring 29 extending radially outwardly beyond the cylindrical surface of the spindle 23. A first or inner bearing means 31 is disposed laterally inwardly of the snap ring 29 and a second or outer bearing means 32 is disposed on the spindle 23 laterally outwardly of the ring 29, the latter serving thereby as an abutment cooperating with the two bearing means 31 and 32. The two bearing units 31 and 32 receive and rotatably support a sleeve or cup-shaped member 33, the laterally inner end 34 of which is formed with a radially inwardly extending flange, and sealing means 35 is carried thereby, acting between the flange and the inner portion of the spindle 23. The laterally outer end of the sleeve 33 is flanged, as at 37, and extends laterally outwardly beyond the outer bearing means 32 a distance sufficient to receive a dished closure member 38 that bears against the radially outer race of the laterally outer bearing unit 32. The sleeve flange 37 is apertured to receive three disk-fastening bolts 41 and a soil-working disk 42 is mounted on the bolts 41, being apertured for that purpose. The disk 42 bears against the closure member 38 and holds the same in position, and the closure member 38 bears snugly against the inner walls of the flanged portion of the bearing sleeve 33. The outer face of the disk 42 receives a reenforcement center member, preferably in the form of a casting 45 that is apertured to receive the threaded ends of the bolts 41 and the securing nuts 46 associated therewith.

The disk and bearing means are assembled on the spindle in the following manner. The sleeve 33, separated from the other parts, is first slipped over the spindle 23, the sealing means 35 fitting snugly against the inner portion of the spindle 23. Next the first or inner bearing means 31 is passed over the outer end of the spindle and against a spacing ring 47 that bears against the outer race of the bearing means 31. The snap ring 29 is then placed in the groove 28 so as to serve as an abutment contacting the inner race of the inner bearing means 31 to prevent outward displacement thereof relative to the spindle. A spacing ring 48 is disposed against the outer race of the inner bearing 31, and then the outer bearing 32 is passed over the outer end of the spindle 23 so as to have the inner race of the outer bearing means lying against the abutment ring 29. Next the closure 38 is placed in the outer end of the sleeve member 33 and then the disk 42 is applied, together with its reenforcing member 45, and the clamping bolts 41 inserted and tightened. The parts are so arranged that the disk bears against the closure member 38 so as to hold the outer race of the bearing 32 in position, with the inner race of the outer bearing 32 held against the outer face of the abutment ring 29. It will be noted that this provides a very compact bearing construction, the inner end of the sleeve member 32 lying substantially in the same plane as the outer edge of the disk 42. As will be seen from Fig. 1, this provides excellent trash clearance for an implement of this kind, so that the disks 42, when necessary, may be brought quite close together without any tendency for the implement to clog with trash and the like. The two axially spaced apart bearing means 31 and 32 provide excellent lateral stability.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. In an agricultural implement, a support including a disk-receiving spindle, abutment means carried by said spindle between the ends thereof, a pair of bearing means, one disposed on opposite sides of said abutment, a cup-shaped member receiving and supported on said spindle by said two bearing means, each of the latter including an outer bearing race and one end of said cup-shaped member being open, a closure member disposed in the outer end of said cup-shaped member and having a portion bearing against the outer end of the outer race of the adjacent bearing means, the radially inner portion of said closure member clearing the inner race of said adjacent bearing means, a disk removably secured to the outer end of said cup-shaped member, and means providing abutting connection between said disk and said closure member whereby when the disk is secured to said cup-shaped member the closure member holds said outer race against outward displacement relative to the cup-shaped member.

2. In an agricultural implement, a support including a disk-receiving spindle, abutment means carried by said spindle between the ends thereof, a pair of bearing means, each having an inner race and an outer race, the inner races being disposed on opposite sides of said abutment, a sleeve member, the inner end of said member being open, a spacing ring carried by said member intermediate the ends thereof, said spacing ring having the same thickness in an axial direction as said abutment means, the outer races of said bearing means being disposed at opposite sides of said spacing ring, a closure member disposed in the outer end of said sleeve member and comprising a dished part having a peripheral portion engaging said outer race of the outer bearing and a central portion disposed so as to lie outwardly of the plane of the outerface of said sleeve member whereby said closure member clears the inner race of said outer bearing means, and the adjacent end of said spindle, and is engaged by the central portion of the disk, when the latter is clamped to said sleeve member, and means to clamp said disk to the outer end of said sleeve member.

References Cited in the file of this patent

UNITED STATES PATENTS

| | | |
|---|---|---|
| 1,803,625 | Larson | May 5, 1931 |
| 2,597,524 | Birt | May 20, 1952 |
| 2,698,565 | Carney | Jan. 4, 1955 |

FOREIGN PATENTS

| | | |
|---|---|---|
| 73,558 | Norway | May 31, 1948 |